Oct. 13, 1931. A. FRIED 1,827,227
CAMERA TRANSPORT CAR
Filed March 15, 1926 3 Sheets-Sheet 3

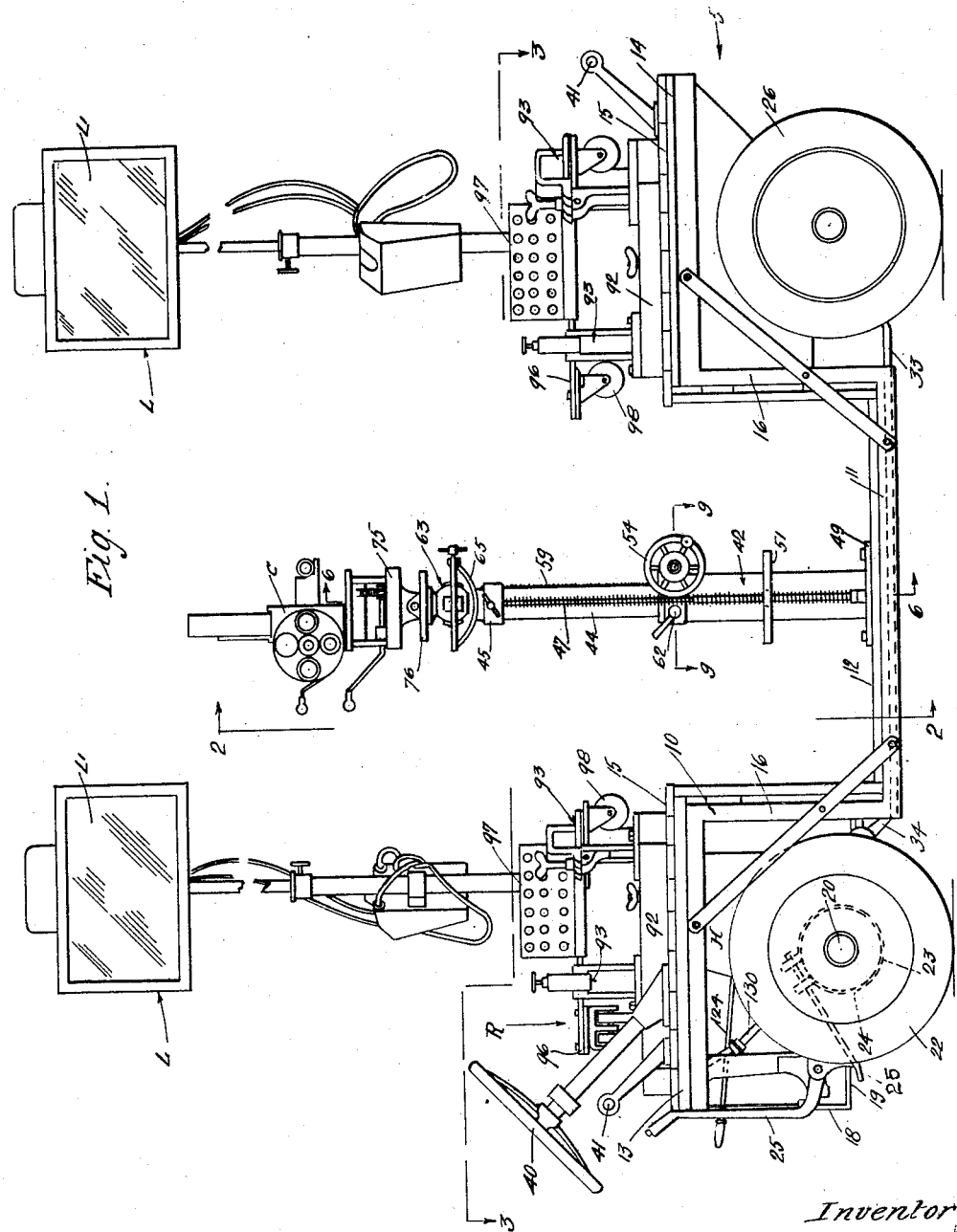

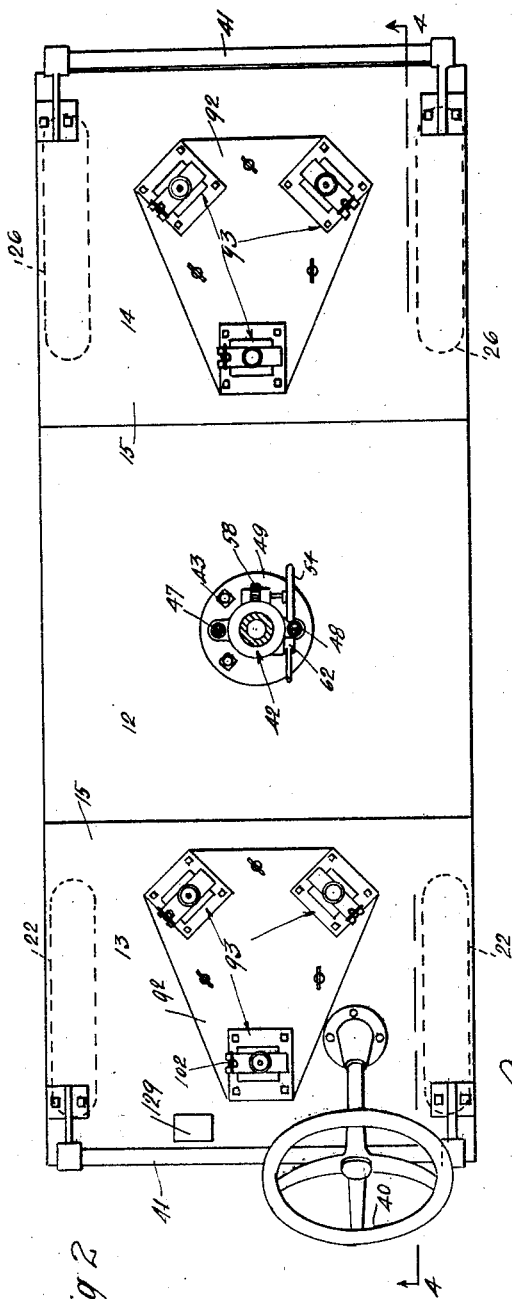

Inventor
Armin Fried
Attorney

Patented Oct. 13, 1931

1,827,227

UNITED STATES PATENT OFFICE

ARMIN FRIED, OF LOS ANGELES, CALIFORNIA, ASSIGNOR TO WILLIAM FOX VAUDE-VILLE COMPANY, OF LOS ANGELES, CALIFORNIA, A CORPORATION OF NEW YORK

CAMERA TRANSPORT CAR

Application filed March 15, 1926. Serial No. 94,720.

This invention relates generally to cars for transporting cameras in taking motion pictures, and is more particularly concerned with means for stabilizing such cars.

I will not attempt here to discuss exhaustively the many features of the invention nor will I attempt to point out the many situations wherein the device may be used to advantage. However, I will point out a few outstanding features of construction and usefulness and from these it will be apparent to those working in the art how the invention may be applied with equal advantage to other situations.

It is frequently desirable that "approach," "receding," or "follow-up" shots be made of action, but it has been impossible to produce satisfactory film showing such shots taken by cameras mounted on usual transport cars. This is for the reason that the least vibration of the car is transmitted to the camera, with poor pictures as a result, and no matter how smooth and level may be the surface over which the car is rolled, such vibrations are bound to occur. For instance, when the operator shifts his weight on the camera platform, there is sure to be a corresponding shift of the camera, and a consequent poor picture. I overcome this difficulty generally by providing a gyroscopic stabilizer for the car, the plane of rotation of the fly wheel being substantially parallel to the vertical longitudinal axial plane of the car, the persistance of the rotating body in its plane of rotation tending to maintain the car in a stable condition and to reduce the vibrations to a minimum.

Preferably the gyroscope is driven from the live axle of traction wheels. With such a connection in effect, the fly wheel, by virtue of its momentum, tends to render the motion of the car equable and regular even though the driving force or resistance to car advance be intermittent or irregular. Thus there is no danger of a "jerky" approach or recession of the car towards or away from the action being filmed, with obvious benefit. I find that even though I run the car up close to the action and then immediately pull it back, there is no perceptible jerk or sudden jar when the movement is reversed.

My invention has many other features of novelty and advantage, but these may be discussed to better advantage and be made more readily apparent in connection with the following detailed description, reference being made to the accompanying drawings, in which:

Fig. 1 is a side elevation of a car embodying my invention;

Fig. 2 is a section on line 3—3 of Fig. 1;

Fig. 3 is a section on line 4—4 of Fig. 1;

I will first describe the general make-up of the car and follow with a description of the stabilizer.

Figure 5:
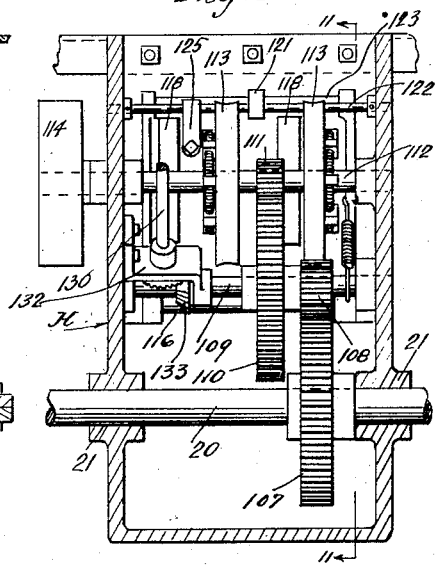
Fig. 5 is a section on line 12—12 of Fig. 4.
Figure 6:
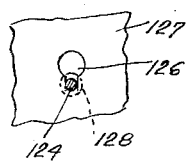
Fig. 6 is a section on line 13—13 of Fig. 4.
Figure 7:
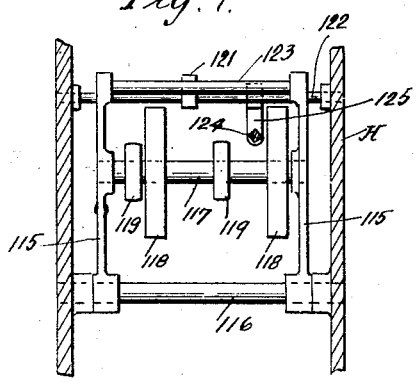
Fig. 7 is a section on line 14—14 of Fig. 4.

Frame 10 is substantially rectangular as viewed in plan, and is preferably made up of angle iron or metal straps. Each side of the frame includes an underslung medial portion 11 which supports the camera platform 12, and elevated end portions 13 and 14 which support light platforms 15; the underslung and elevated portions of the frame being connected by vertical members 16. The ends of the frame sides are connected by cross bars 17 (Fig. 3) and connected to the cross bar and vertical member 16 at the rear end R of the car are the horizontally spaced hanger irons 18, to the horizontal members 19 of which is secured housing H. Housing H may properly be considered as a part of frame 10 since it acts as a spacer between frame parts 13 and 19. Live axle 20 is journaled at 21 (Fig. 5) in the housing walls and carries rear traction wheels 22 which are fixed against rotation with respect to said axle. Wheels 22 may have brake drums conventionally illustrated at 23 in Fig. 1, about which bands 24 may be contracted by actuation of brake lever 25.

The forward wheels 26 preferably are dirigible, being mounted for rotation on spindles 30 in the usual manner. A connecting link 31 connects the two knuckles so the wheels are held against relative movement but may be moved as one by actuation of the single crank arm 32 on one of the knuckles. Arm 32 is moved by reach rod 33 which has usual connection with crank 34 on shaft 35, the latter being journaled on frame 10 as shown in Fig. 3. Shaft 35 also carries gear segment 36 with which is meshed pinion 37 on steering post 38, this shaft being journaled at 39 on the hanger 19 and being controlled by usual steering wheel 40.

Handle bars 41 may be located at each end of the car to provide means whereby the car may be pushed or pulled.

Camera C is mounted on post 42 which rises from central platform 12, while lamps L are clamped to platforms 15.

As explained in the fore part of this specification, I employ a gyroscopic device for stabilizing the car. The gyroscopic elements are contained within housing H, and while I will specifically term certain wheels as fly wheels, it will be understood all the gears are so arranged that they have a stabilizing effect to a certain extent.

Axle 20 carries a gear 107 which meshes with pinion 108 on shaft 109, the latter being journaled in the housing walls. Shaft 109 carries gear 110, preferably of about the same diameter as 107, and this gear meshes with pinion 111 on shaft 112. Shaft 112 is journaled in the housing walls and carries any desired number of fly wheels; for instance, I have shown two fly wheels 113 within housing H and one wheel 114 without the housing. The connection between shaft 112 and wheels 113 and 114 is preferably of the gradual take-up or resilient type conventionally indicated at 113a. Shafts 109 and 112 are substantially axially parallel to axle 20 and the gear ratio is such that one revolution of traction wheels 22 gives great angular velocity to wheels 113 and 114. It will be seen that the plane of rotation of the gears and fly wheels are substantially parallel to the normally vertical, longitudinal axis of the car, and the persistence of the rotary bodies in their plane of rotation tends to maintain the car in a stable condition and to reduce the vibrations and side sway to a minimum.

Furthermore, due to the driving connection between the axle and the fly wheels, said wheels, by virtue of their momentum, tend to render the motion of the car equable and regular even though the driving force or resistance to car advance be intermittent or irregular.

The driving connection between axle and wheels also forces desirable, comparatively slow pick-up in car speed as will be readily understood. When the car is run down grade it is naturally desired that there be gained a braking effect and yet that such braking effect in no wise tend to jar the car, interfere with the stabilizing effect of the gyroscope, or wear out brake bands. Therefore, I have introduced a supplemental set of fly wheels which may be thrown into driving connection with the axle to gain the desired effect.

A carrier or yoke 115 is pivoted on the housing-carried shaft 116, and carries a shaft 117 on which are supplemental fly wheels 118 and crowned friction disks 119. Shafts 112, 116 and 20 being parallel, it will be seen that yoke 115 is mounted for pivotal movement about an axis parallel to the axes of rotation of both shafts 112 and 20. The disks are adapted to be held in frictional engagement with the complementary concave peripheral faces of fly wheels 113, by a spring 120 acting between shaft 109 and yoke 115. When the disks are thus held in engagement with the fly wheels, it will be seen that fly wheels 118 are drivingly connected with axle 20, contributing to the stabilizing effect and acting to check the speed of the car on down grades.

Figure 4:
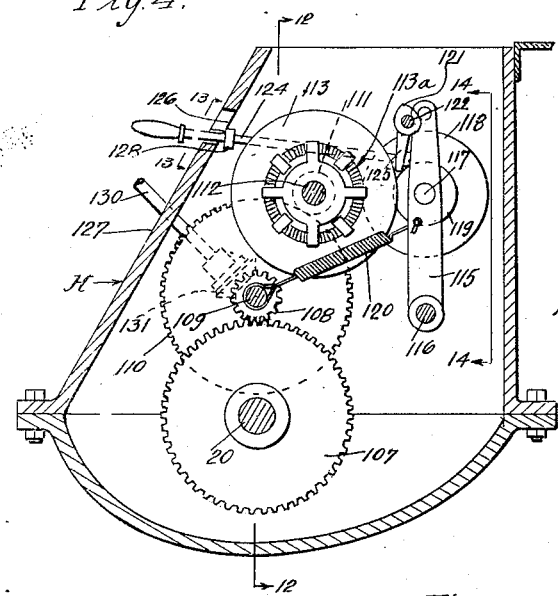
Fig. 4 is a section through the gyroscope housing.

Normally, however, the yoke is swung to clear disks 119 from wheels 111, any suitable means being provided for thus swinging the yoke. For instance, I may mount a cam 121 on a housing carried rock shaft 122, this shaft being rocked to rotate the cam against yoke rod 123 and thereby swing the friction disks clear of wheels 111, by moving operating rod 124, to the left, as viewed in Fig. 4, this rod being pivotally connected to a crank arm 125 on shaft 122. Rod 124 extends through a bayonet slot 126 in the rear wall 127 of housing H and normally lies in the narrow portion of this slot. A collar 128 on the rod lies within the housing when cam 121 is inoperative, that is, when disks 119 and wheels 111 are frictionally engaged. When the cam is to be rotated to clear the disks and wheels, rod 124 is first lifted until collar 128 is in alignment with the enlarged portion of the slot, and then drawn to the left in Fig. 4 until the cam acts as described, at which time collar 128 will lie at the outside of the housing. Consequently, when rod 124 is lowered into the narrow portion of the slot, collar 128 engages the outer face of the housing to hold the rod (and hence the cam) releasably in operative position against the action of spring 120.

It will be understood that while I have shown and described a specific embodiment of my invention, the drawings and description are to be considered merely as illustrative of and not restrictive on the broader claims appended hereto, for various changes in design, structure and arrangement may be made without departing from the spirit and scope of said claims.

I claim:

1. In a camera transport car, traction wheels, a frame supported on said wheels, a shaft rotatably supported by said frame and drivingly connected to one of said traction wheels, a carrier mounted on the frame for pivotal movement about an axis parallel to said shaft and movable pivotally towards and away from said shaft, a fly wheel carried by said carrier and movable into and out of driven relationship with said shaft by pivotal movement of the carrier respectively towards and away from said shaft, and means for pivotally moving the carrier.

2. In a camera transport car, traction wheels, a frame supported on said wheels, a shaft rotatably supported by said frame and drivingly connected to one of said traction wheels, a carrier mounted on the frame for pivotal movement about an axis parallel to said shaft and movable pivotally towards and away from said shaft, a second shaft carried by said carrier in parallel relationship with the axis of rotation of the traction wheels, a fly-wheel on said second shaft and rotatable in a plane substantially parallel to the normally vertical, longitudinal axial plane of the car, said fly wheel being movable into and out of driven relationship with said first mentioned shaft by pivotal movement of the carrier respectively towards and away from said first mentioned shaft, and means for pivotally moving the carrier.

3. In a camera transport car, traction wheels, a frame supported on said wheels, a shaft rotatably supported by said frame and drivingly connected to one of said traction wheels, a carrier mounted on the frame for pivotal movement about an axis parallel to said shaft and movable pivotally towards and away from said shaft, a disk carried on said shaft, a second shaft carried by said carrier in parallel relationship with said first mentioned shaft, a fly wheel on said second shaft and in the plane of rotation of said disk, said fly wheel being movable into and out of peripheral engagement with said disk by pivotal movement of the carrier respectively towards and away from said first mentioned shaft and being adapted to be frictionally driven by said disk when in peripheral engagement therewith, and means for pivotally moving the carrier.

In witness that I claim the foregoing I have hereunto subscribed my name this 24th day of February, 1926.

ARMIN FRIED.